US011538474B2

(12) United States Patent
Choi et al.

(10) Patent No.: US 11,538,474 B2
(45) Date of Patent: Dec. 27, 2022

(54) ELECTRONIC DEVICE AND METHOD FOR CONTROLLING THE ELECTRONIC DEVICE THEREOF

(71) Applicant: Samsung Electronics Co., Ltd., Suwon-si (KR)

(72) Inventors: Hyungtak Choi, Suwon-si (KR); Hannam Kim, Suwon-si (KR); Sunghwan Baek, Suwon-si (KR); Haehun Yang, Suwon-si (KR); Kwanho Lee, Suwon-si (KR); Namkoo Lee, Suwon-si (KR); Daye Lee, Suwon-si (KR); Yeseul Lee, Suwon-si (KR); Hojung Lee, Suwon-si (KR); Jisun Choi, Suwon-si (KR); Inchul Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 146 days.

(21) Appl. No.: 16/993,878

(22) Filed: Aug. 14, 2020

(65) Prior Publication Data

US 2021/0090565 A1 Mar. 25, 2021

(30) Foreign Application Priority Data

Sep. 19, 2019 (KR) .................. 10-2019-0115631

(51) Int. Cl.
*G10L 15/22* (2006.01)
*G10L 15/30* (2013.01)
*G10L 15/18* (2013.01)

(52) U.S. Cl.
CPC .......... *G10L 15/22* (2013.01); *G10L 15/1815* (2013.01); *G10L 15/30* (2013.01); *G10L 2015/223* (2013.01); *G10L 2015/226* (2013.01)

(58) Field of Classification Search
CPC ..... G10L 15/22; G10L 15/1815; G10L 15/30; G10L 2015/223; G10L 2015/226;
(Continued)

(56) References Cited

U.S. PATENT DOCUMENTS 7,685,254 B2   3/2010  Pandya
8,635,185 B2   1/2014  Somogyi et al.
(Continued)

FOREIGN PATENT DOCUMENTS

JP   2005332174 A  *  12/2005
JP   2005332174 A     12/2005
(Continued)

OTHER PUBLICATIONS

Translation for JP-2005-332174A (Year: 2005).*
International Search Report dated Nov. 17, 2020, issued in International Patent Application No. PCT/KR2020/010696.

*Primary Examiner* — Daniel C Washburn
*Assistant Examiner* — Athar N Pasha
(74) *Attorney, Agent, or Firm* — Jefferson IP Law, LLP

(57) ABSTRACT

An electronic device and a method for controlling the same are provided. The electronic device includes a microphone, a memory storing at least one instruction and dialogue history information, and a processor configured to be connected to the microphone and the memory and control the electronic device, in which the processor, by executing the at least one instruction, is configured to, based on a user's voice being input via the microphone, obtain response information for generating a response sentence to the user's voice, select at least one template phrase for generating the response sentence to the user's voice based on the stored dialogue history information, generate the response sentence using the response information and the at least one template phrase, and output the generated response sentence.

14 Claims, 11 Drawing Sheets

(58) Field of Classification Search
CPC ....... G10L 17/24; G06F 40/186; G06F 40/30; H04M 1/72403; H04M 2201/36; H04M 2201/34; H04M 2201/38
See application file for complete search history.

(56) References Cited

U.S. PATENT DOCUMENTS

| | | | |
|---|---|---|---|
| 8,762,379 B2 | 6/2014 | Birdwell et al. | |
| 8,850,588 B2 | 9/2014 | Kumar et al. | |
| 9,788,055 B2 | 10/2017 | Verrilli et al. | |
| 10,002,130 B1* | 6/2018 | Thomas | G16H 10/60 |
| 10,157,179 B2 | 12/2018 | Bao et al. | |
| 10,210,470 B2 | 2/2019 | Datta Ray | |
| 10,470,005 B1* | 11/2019 | Rathnam | G06F 3/167 |
| 2003/0171926 A1* | 9/2003 | Suresh | H04M 3/4938 704/270.1 |
| 2011/0010165 A1 | 1/2011 | Park et al. | |
| 2018/0218731 A1 | 8/2018 | Gustafson et al. | |
| 2018/0373696 A1* | 12/2018 | Terry | G06N 20/20 |
| 2019/0088252 A1 | 3/2019 | Yoshida et al. | |
| 2019/0130904 A1 | 5/2019 | Homma et al. | |
| 2019/0294678 A1* | 9/2019 | Sapugay | G06N 20/00 |
| 2019/0325864 A1* | 10/2019 | Anders | G10L 15/22 |
| 2020/0090645 A1* | 3/2020 | Satoh | G10L 15/22 |
| 2021/0065702 A1* | 3/2021 | Fink | G06N 3/08 |

FOREIGN PATENT DOCUMENTS

| | | |
|---|---|---|
| JP | 2014-191030 A | 10/2014 |
| KR | 10-2006-0070605 A | 6/2006 |
| KR | 10-2008-0052304 A | 6/2008 |
| KR | 10-2011-0006004 A | 1/2011 |
| KR | 10-1370831 B1 | 3/2014 |
| KR | 10-1655958 B1 | 9/2016 |

* cited by examiner

FIG. 1
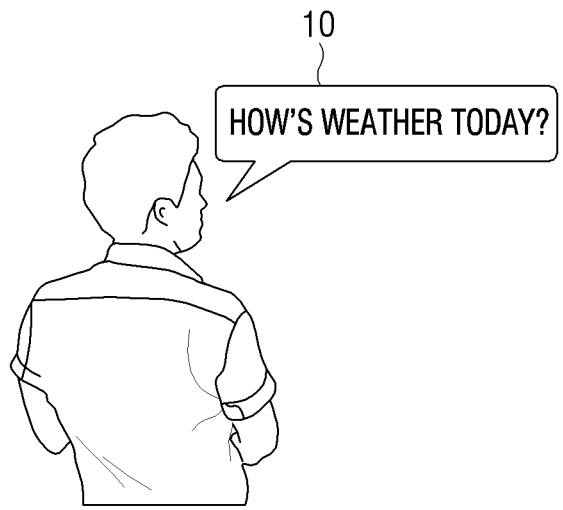
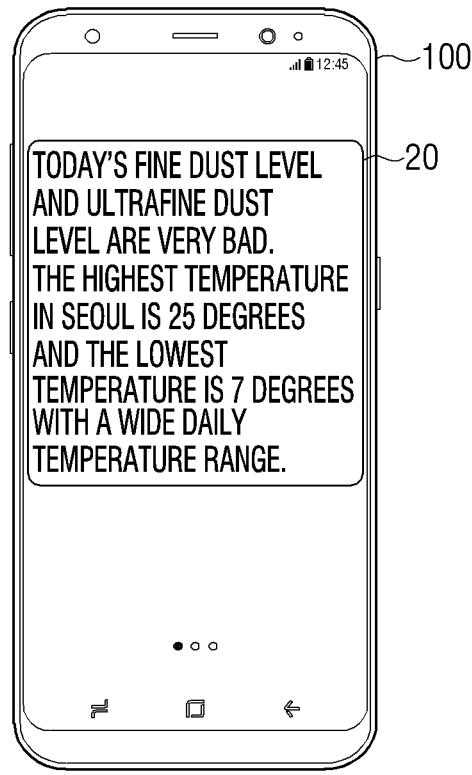
AUGUST 29, 2019
(a)
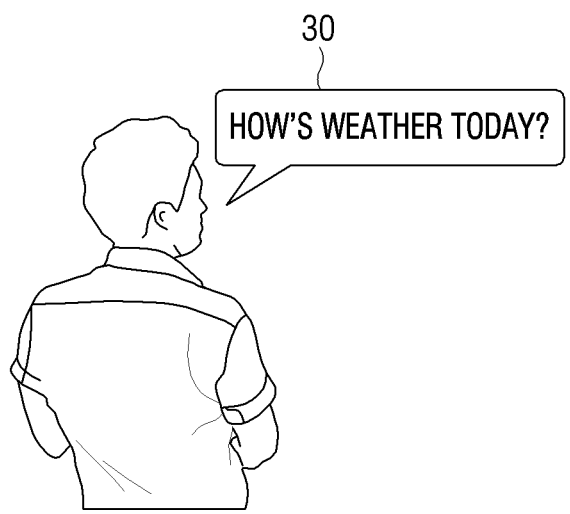
AUGUST 30, 2019
(b)

FIG. 7

BEFORE CORRECTION  710

1. TOMORROW IS GOING TO BE SUNNY AND FINE DUST LEVEL IS GOING TO BE HIGH. THE UV INDEX IS GOING TO BE HIGH.
2. MONDAY IS GOING TO BE SUNNY AND TUESDAY IS GOING TO BE SUNNY.
3. TODAY'S TEMPERATURE IS 25 DEGREES WHICH IS -1 DEGREE HIGHER THAN YESTERDAY

AFTER CORRECTION  720

1. TOMORROW IS GOING TO BE SUNNY, AND FINE DUST LEVEL AND UV INDEX ARE GOING TO BE HIGH.
2. MONDAY AND TUESDAY ARE GOING TO BE SUNNY.
3. TODAY'S TEMPERATURE IS 25 DEGREES WHICH IS 1 DEGREE LOWER THAN YESTERDAY.

ELECTRONIC DEVICE AND METHOD FOR CONTROLLING THE ELECTRONIC DEVICE THEREOF

CROSS-REFERENCE TO RELATED APPLICATION(S)

This application is based on and claims priority under 35 U.S.C. § 119(a) of a Korean patent application number 10-2019-0115631, filed on Sep. 19, 2019, in the Korean Intellectual Property Office, the disclosure of which is incorporated by reference herein in its entirety.

BACKGROUND

1. Field

The disclosure relates to an electronic device and a method for controlling the same. More particularly, the disclosure relates to an electronic device for selecting a template phrase for generating a response sentence to a user's voice based on dialogue history information and a method for controlling the same.

2. Description of Related Art

The artificial intelligence (AI) system is a computer system with intelligence of a human level and in which a machine trains, determines, and becomes smart itself, unlike the rule-based smart system of the related art. As the artificial intelligence system is used, a recognition rate is improved and preferences of a user can be more accurately understood. Thus, the rule-based smart system of the related art is gradually being replaced with the deep learning-based artificial intelligence system.

The artificial intelligence technologies are composed of machine learning (e.g., deep learning) and elementary technologies using the machine learning. The machine learning is an algorithm technology of self-classifying/self-training features of input data, and the elementary technology is a technology using the machine learning algorithm such as the deep learning and is composed of technical fields of language understanding, visual understanding, inference/prediction, knowledge representation, operation control, and the like.

In particular, the language understanding is a technology of recognizing languages/alphabets of human and applying/processing it and includes natural language processing, machine translation, a dialogue system, question and answer, speech recognition/synthesis, and the like.

However, in a case of the natural language processing technology of the related art, a response sentence to a user's voice was generated using only a predetermined template and information stored in a database. Accordingly, with the natural language processing technology of the related art, response sentences reflecting information, that is considered important for each user, were not able to be generated, and only response sentences using the same information and the same template were able to be generated.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for selecting a template phrase for generating a response sentence to a user's voice based on dialogue history information and a method for controlling the same.

Additional aspects will be set forth in part in the description which follows and, in part, will be apparent from the description, or may be learned by practice of the presented embodiments.

In accordance with an aspect of the disclosure, an electronic device is provided. The electronic device includes a microphone, a memory storing at least one instruction and dialogue history information, and a processor configured to be connected to the microphone and the memory and control the electronic device, in which the processor, by executing the at least one instruction, is configured to, based on a user's voice being input via the microphone, obtain response information for generating a response sentence to the user's voice, select at least one template phrase for generating the response sentence to the user's voice based on the stored dialogue history information, generate the response sentence using the response information and the at least one template phrase, and output the generated response sentence.

In accordance with another aspect of the disclosure, a method for controlling an electronic device is provided. The method includes based on a user's voice being input, obtaining response information for generating a response sentence to the user's voice, selecting at least one template phrase for generating the response sentence to the user's voice based on the stored dialogue history information, generating the response sentence using the response information and the at least one template phrase, and outputting the generated response sentence.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1 is a view for illustrating operations of an electronic device according to an embodiment of the disclosure;

FIG. 7 is a view for illustrating a process of correcting a response sentence by an electronic device according to an embodiment of the disclosure;

Throughout the drawings, it should be noted that like reference numbers are used to depict the same or similar elements, features, and structures.

DETAILED DESCRIPTION

Figure 2:
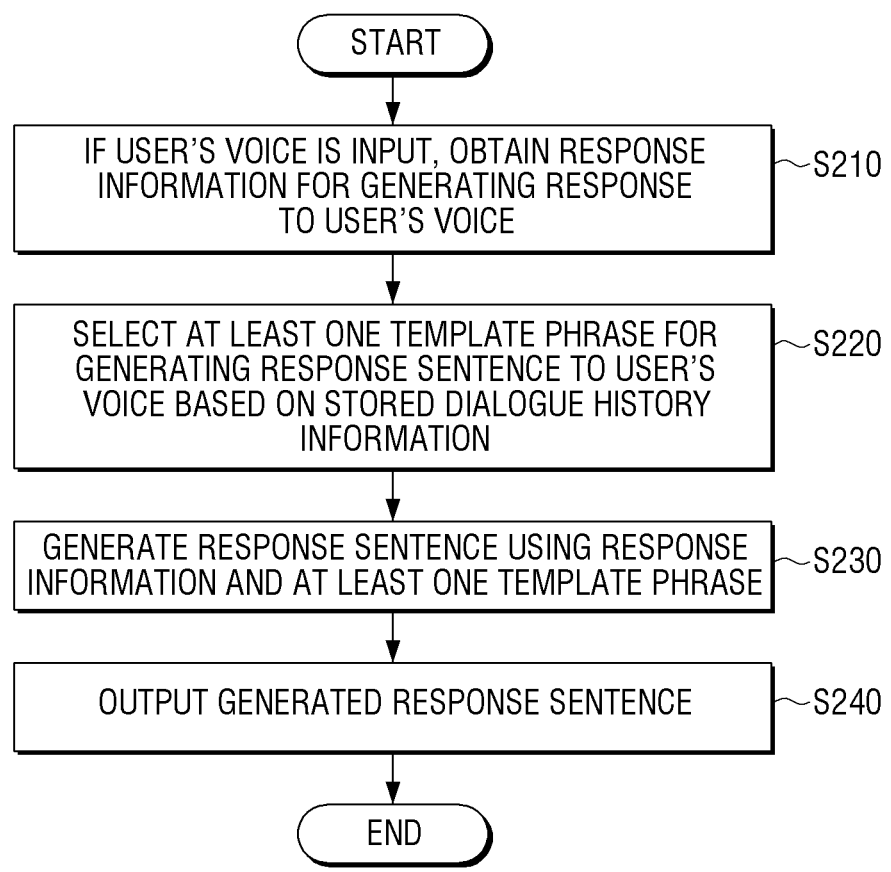
FIG. 2 is flowchart for illustrating a method for controlling an electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The disclosure is made in view of the above-mentioned needs and provides an electronic device for selecting at least one template phrase for generating a response sentence to a user's voice based on dialogue history information and generating a response sentence based on response information and the template phrase, and a method for controlling the same.

Hereinafter, embodiments of the disclosure will be described with reference to the drawings.

FIG. 1 is a view for illustrating operations of an electronic device according to an embodiment of the disclosure.

Referring to FIG. 1, an electronic device 100 according to an embodiment of the disclosure may obtain response information for generating a response to input user's voices 10 and 30. Specifically, the electronic device 100 may receive response information from an external server or use response information stored in the electronic device 100. In an embodiment, the electronic device 100 may determine whether to transmit the user's voice to an external server and receive response information from the external server based on a domain of a text corresponding to the user's voice. A process of determining whether to transmit the user's voice to the external server will be described in detail with reference to FIG. 3.

The response information may be information necessary for generating a response sentence to the user's voice. In an embodiment, the electronic device 100 may obtain information related to a plurality of categories by clustering at least one of the response information and dialogue history information. The information related to the plurality of categories may include information for dividing each category into a plurality of levels (e.g., level criteria information of fine dust or harmful level criteria information of ultraviolet (UV) index), numerical value information related to each category (e.g., amount of fine dust), and the like.

For example, if the user's voices 10 and 30 are questions about the weather as illustrated in FIG. 1, the electronic device 100 may obtain information related to each category of fine dust, UV, the highest temperature, and the like by clustering response information to the questions about the weather, information related to response sentences to the user's voices generated in the past, and the like. The information related to the category may include predetermined international fine dust standard information in which numerical values of fine dust are able to be divided into a plurality of levels, information regarding hourly fine dust level, and information regarding the user's voice related to the fine dust.

Meanwhile, the dialogue history information may be an assembly of information generated by inputting the user's voice to the electronic device 100. In an embodiment, the dialogue history information may include history information of a user's voice input to the electronic device 100, information related to a response sentence to the user's voice generated in the past (e.g., style information of a response sentence generated in the past, information related to a plurality of categories included in a response sentence generated in the past, and the like), response information obtained for generating a response sentence to the user's voice, and the like.

The clustering is an unsupervised learning algorithm for classifying data into groups of similar pieces of data and obtaining information for dividing the classified group into a plurality of levels (e.g., distribution range of information included in each category or the like).

In an embodiment, the electronic device 100 may select at least one template phrase for generating a response sentence to a user's voice based on dialogue history information. The electronic device may generate the response sentence using response information and the at least one template phrase. In an embodiment, the electronic device 100 may select a template phrase for generating a response sentence to the user's voice based on history information of input user's voice and information regarding response sentences generated in the past.

In an embodiment, as illustrated in (a) of FIG. 1, if a user's voice including a question about the weather is input, the electronic device 100 may select a template phrase (e.g., "The fine dust level is") using information indicating that the response sentence was generated using template phrases such as "Today's weather is", "The highest temperature is", and "The fine dust level is". If information related to the fine dust category indicating that the fine dust level is very bad is obtained, the electronic device 100 may generate a response sentence of "Today's fine dust level is very bad". The template phrase is a phrase for generating a response sentence including constant meaning, when data is input.

In an embodiment of the disclosure, the electronic device 100 may obtain a plurality of phrases for generating the response sentence based on the plurality of template phrases corresponding to the information related to the plurality of categories. In an embodiment, as illustrated in response sentence 20 (a) of FIG. 1, if information indicating that the fine dust level and the ultrafine dust level are very bad and the highest temperature and the lowest temperature are respectively 25 degrees and 7 degrees is obtained, the electronic device 100 may obtain a template phrase corresponding to information related to the category (e.g., fine dust level, ultrafine dust level, maximum temperature index, and lowest temperature index). In addition, the electronic device 100 may obtain a plurality of phrases for generating response sentences of "The fine dust level is very bad", "The ultrafine dust level is very bad", "The highest temperature is 25 degrees and the lowest temperature is 7 degrees".

According to an embodiment, the electronic device 100 may generate a response sentence by combining at least one of the plurality of phrases based on the dialogue history information and importance of the information related to the plurality of categories.

In an embodiment, the electronic device 100 may obtain numerical values representing importance of each of pieces of information related to the plurality of categories based on the dialogue history information. Specifically, the electronic device 100 may obtain numerical values representing importance of each of pieces of information related to the plurality of categories based on the dialogue history information including voice history information of a user and information related to response sentences generated in the past.

For example, as illustrated in (a) of FIG. 1, the electronic device 100 may obtain a percentage of information related to the "fine dust level", the "ultrafine dust level", and the "temperature" included in the voice history information of the user and the information related to the response sentences generated in the past. The electronic device 100 may obtain numerical values representing importance of each of pieces of information related to the plurality of categories, in proportion to the obtained percentage. If numerical values representing the importance of information related to the "fine dust level", the "ultrafine dust level", and the "temperature" are the highest values, the electronic device 100 may generate response sentences of "Today's fine dust level and ultrafine dust level are very bad. The highest temperature in Seoul is 25 degrees and the lowest temperature is 7 degrees with a wide daily temperature range" by combining the corresponding phrases with the phrases corresponding to the "fine dust level", the "ultrafine dust level", and the "temperature".

In an embodiment, the electronic device 100 may determine a combination order of at least one phrase corresponding to the information related to the category based on the numerical value representing the importance of each of pieces of information related to the plurality of categories, and generate the response sentence by combining the at least one phrase according to the determined combination order. For example, if the numerical value representing the importance of the "fine dust level" among the information related to the category is higher than the numerical value representing the importance of the "highest temperature and the lowest temperature", the electronic device 100 may generate the response sentence in which the phrase corresponding to the "fine dust level" is arranged before the phrase corresponding to the "snowfall".

In another embodiment, if a user command implying determination of the importance of the information related to each category is input, the electronic device 100 may determine the combination order of at least one phrase corresponding to the information related to the category based on the user command and generate a response sentence by combining the at least one phrase according to the determined combination order. The embodiment related thereto will be described in detail with reference to FIG. 8.

In an embodiment of the disclosure, if a phrase corresponding to the first category not included in the dialogue history information exists among the plurality of obtained phrases, the electronic device 100 may generate a response sentence including the phrase corresponding to the first category. For example, when one of the plurality of obtained phrases is "it is hailing and", and if information related to "hail" which is a category corresponding thereto does not exist in the dialogue history information, the electronic device 100 may generate a response sentence including a phase of "it is hailing and". In other words, the electronic device 100 may generate a response sentence using a phrase not included in the response sentences in the past.

In an embodiment, if information related to the category corresponding to all of the plurality of obtained phrases is included in the dialogue history information, the electronic device 100 may generate a response sentence by removing the plurality of phrases and selecting at least one of new template phrases. As illustrated in (b) of FIG. 1, if the phrases obtained on Aug. 30, 2019 are the "fine dust level is very bad", "the ultrafine dust level is very bad", and the "highest temperature is 25 degrees and the lowest temperature if 7 degrees", and all of the fine dust level, the ultrafine dust level, and the temperature information which are information related to the categories corresponding to the obtained phrases are included in the dialogue history information obtained on Aug. 29, 2019, the electronic device 100 may generate a response sentence of "It's like yesterday's weather 40" by removing the obtained phrases and selecting a new template phrase.

The electronic device 100 may correct a response sentence to a user's voice generated based on the dialogue history information. Specifically, the electronic device 100 may correct an expression or a word of the response sentence newly generated based on information related to the response sentences stored in the past and input user's voice history information. In an embodiment, if the meanings of at least two or more words are overlapped among the plurality of words included in the response sentence, the electronic device 100 may generate a response sentence by removing the word having the overlapped meaning and recombining a plurality of phrases based on the dialogue history information. For example, if a response sentence of "Today's fine dust level is very bad and ultrafine dust level is very bad" is generated, the electronic device 100 may identify that the words with meaning of "very bad" are overlapped in the response sentence. Accordingly, the electronic device 100 may generate the response sentence of "Today's fine dust level and ultrafine dust level are very bad" by removing the overlapped word and recombining the phrases based on the dialogue history information. An embodiment in which the electronic device 100 corrects the response sentence based on the dialogue history information will be described in detail with reference to FIG. 7.

FIG. 2 is a flowchart for illustrating a method for controlling an electronic device according to an embodiment of the disclosure.

Referring to FIG. 2, first, if a user's voice is input, the electronic device 100 may obtain information for generating a response to the user's voice S210. In an embodiment, the electronic device 100 may transmit the user's voice to an external server and receive and obtain response information from the external server. In another embodiment, the electronic device 100 may generate a response sentence based on response information stored therein. The process of determining whether to transmit the user's voice to the external server by the electronic device 100 will be described in detail with reference to FIG. 3.

The electronic device 100 may select at least one template phrase for generating the response sentence to the user's voice based on stored dialogue history information S220.

Specifically, the electronic device 100 may select at least one template phrase based on history information of the input user's voice and information regarding response sentences generated in the past.

In addition, the electronic device 100 may generate the response sentence using the response information and the at least one template phrase S230. In an embodiment, the electronic device 100 may obtain information related to a plurality of categories by clustering at least one of the response information and the dialogue history information. The electronic device 100 may obtain a plurality of phrases for generating the response sentence based on the plurality of template phrases corresponding to the information related to the plurality of categories.

The electronic device 100 may generate the response sentence by combining at least one of the plurality of phrases based on the dialogue history information and the importance of the information related to the plurality of categories.

In an embodiment, the electronic device 100 may obtain a numerical value representing importance of each of information related to the plurality of categories based on the dialogue history information, and generate the response sentence by combining at least one of the plurality of phrases corresponding to the information related to the plurality of categories. The electronic device 100 may determine a combination order of the at least one phrase corresponding to the information related to the category based on the numerical value representing the importance of each of the information related to the plurality of categories, and generate the response sentence by combining the at least one phrase according to the determined combination order.

In an embodiment, if a user command implying determination of the importance of the information related to the plurality of categories is input, the electronic device 100 may generate the response sentence by combining at least one of the plurality of phrases based on the user command implying determination of the importance.

In another embodiment, if a phrase corresponding to a first category not included in the dialogue history information exists in the plurality of obtained phrases, the electronic device 100 may generate the response sentence including the phrase corresponding to the first category.

In another embodiment, if the information related to the category corresponding to all of the plurality of obtained phrases is included in the dialogue history information, the electronic device 100 may generate the response sentence by removing the plurality of phrases and selecting at least one of new template phrases.

The electronic device 100 may correct the response sentence to the user's voice generated based on the dialogue history information. For example, if meanings of at least two or more words are overlapped among a plurality of words included in the response sentence to the user's voice, the electronic device 100 may generate the response sentence by removing the word with the overlapped meaning and recombining the plurality of phrases based on the dialogue history information.

The electronic device 100 may output the generated response sentence S240.

Figure 3:
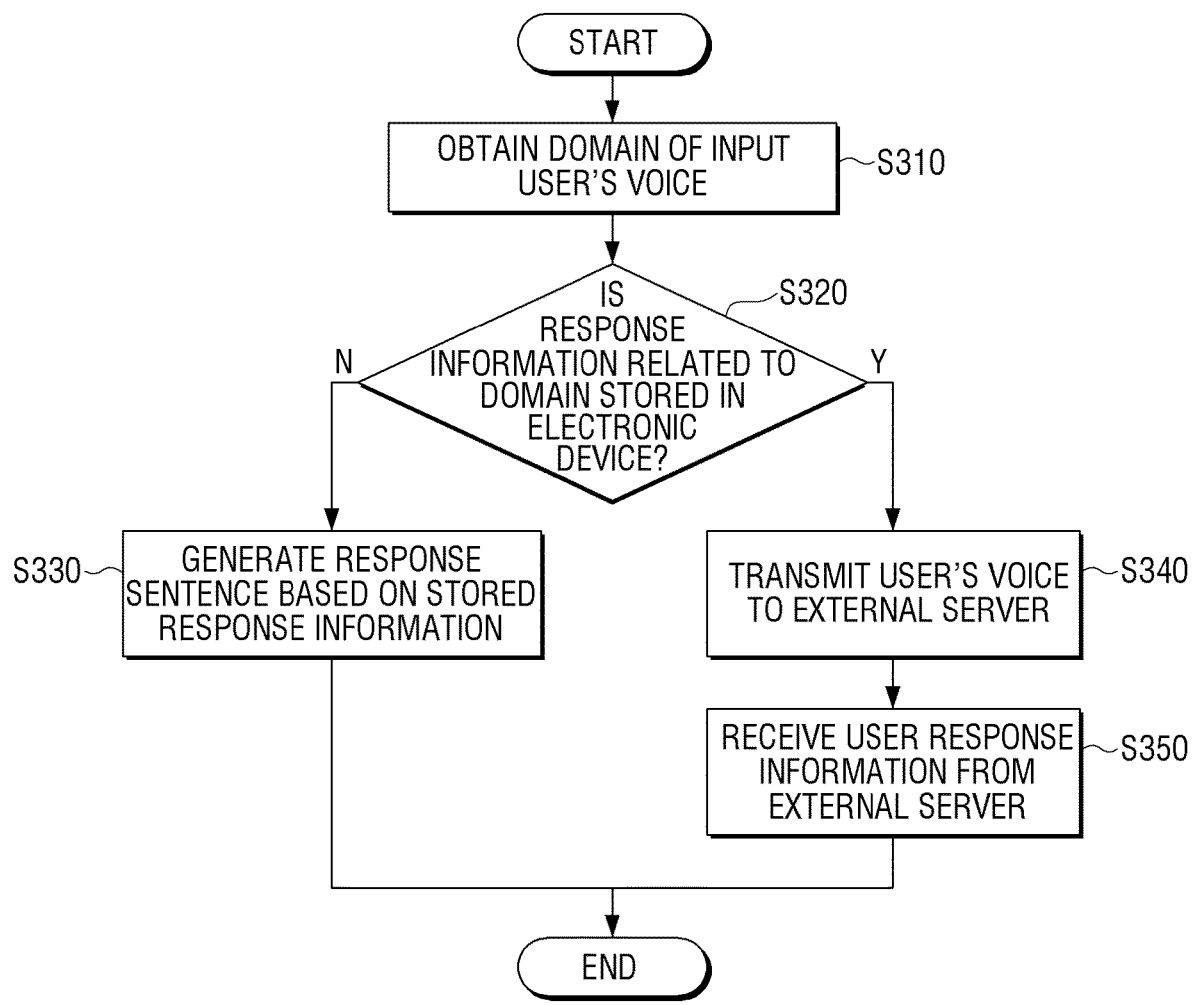
FIG. 3 is a flowchart for illustrating a process of determining whether to transmit a user's voice to an external server by an electronic device according to an embodiment of the disclosure.

FIG. 3 is a flowchart for illustrating a process of determining whether to transmit the user's voice to an external server by an electronic device according to an embodiment of the disclosure.

Referring to FIG. 3, the electronic device 100 may obtain a domain of the input user's voice S310. Specifically, the electronic device 100 may obtain a domain of a text corresponding to the user's voice through a natural language understanding (NLU) module included in a stored dialogue system. The dialogue system is an artificial intelligence model providing a response to a user's voice by recognizing and analyzing the input user's voice. The process of obtaining the domain of the voice through the NLU module will be described in detail with reference to FIG. 10.

The electronic device 100 may determine whether to transmit the user's voice to an external server based on the domain. In an embodiment, the electronic device 100 may determine whether to transmit the user's voice to the external server according to whether the response information related to the domain is stored in the electronic device 100 S320. For example, if the user's voices 10 and 30 of "How's weather today?" are input, the electronic device 100 may determine whether to transmit the user's voice to the external device according to whether the response information related to the "weather" which is the domain of the user's voice is stored in the electronic device 100.

If the user's voice is determined not to be transmitted to the external server, the electronic device 100 may generate the response sentence based on the stored response information S330. If the user's voice is determined to be transmitted to the external server, the electronic device 100 may transmit the user's voice to the external server S340 and receive the response information from the external server S350.

Figure 4:
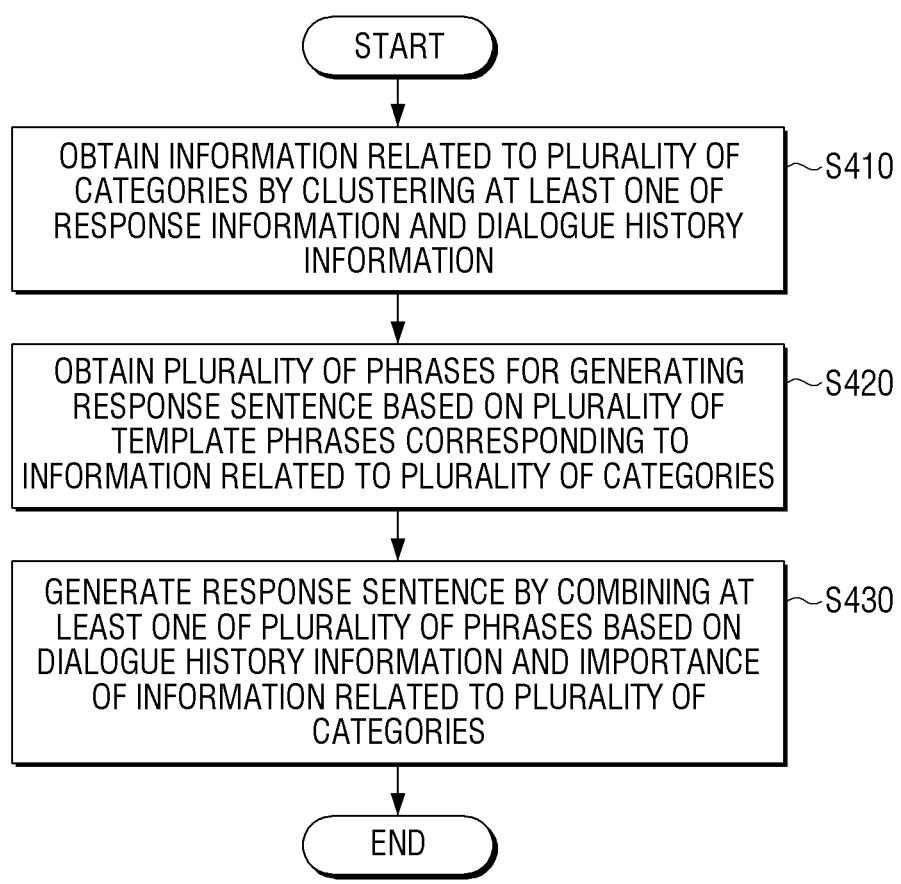
FIG. 4 is a flowchart for illustrating a process of generating a response sentence by an electronic device according to an embodiment of the disclosure.

FIG. 4 is a flowchart for illustrating a process of generating a response sentence by an electronic device according to an embodiment of the disclosure.

Referring to FIG. 4, the electronic device 100 may obtain information related to a plurality of categories by clustering at least one of response information and dialogue history information S410. Specifically, the electronic device 100 may classify the response information into a plurality of categories by clustering the response information and the dialogue history information and obtain information related to each classified category (e.g., information for dividing each category into a plurality of levels, numerical value information of each category, and the like).

For example, if weather information corresponding to the user's voice of "How's weather today?" is obtained, the electronic device 100 may obtain the numerical value information of each category such as the fine dust, the UV index, the highest temperature, and the like and the information for dividing each category into a plurality of levels by clustering weather information and dialogue history information related to the weather.

The electronic device 100 may obtain the plurality of phrases for generating the response sentence based on the plurality of template phrases corresponding to the information related to the plurality of categories S420. In an embodiment, if the obtained information related to the plurality of categories is information related to the fine dust level and the highest temperature, the electronic device 100 may obtain a plurality of phrases ("The fine dust level is very bad" and "The highest temperature is 35 degrees) using template phrases (e.g., the "The fine dust level is" and "The highest temperature is") corresponding to the fine dust level and the highest temperature.

The electronic device 100 may generate a response sentence by combining at least one of the plurality of phrases based on the dialogue history information and the importance of the information related to the plurality of categories S430.

In an embodiment, the electronic device 100 may obtain a numerical value representing the importance of each information related to the plurality of categories based on the dialogue history information. Specifically, the electronic device 100 may obtain a percentage of each of information related to the plurality of categories included in the information related to the response sentence generated in the past, the user's voice history information, and the like. The electronic device 100 may obtain numerical values representing importance of each of information related to the plurality of categories in proportion to the obtained percentage. Accordingly, if a percentage of information related to the fine dust among information related to the plurality of categories, included in the dialogue history information is higher than a percentage of information related to the UV index included in the dialogue history information, a numerical value representing the importance of the information related to the fine dust may be higher than that of the UV index.

In addition, in an embodiment, the electronic device 100 may determine a combination order of at least one phrase corresponding to the information related to the category based on the numerical value representing the importance of each of information related to the plurality of categories. The electronic device 100 may generate the response sentence by combining at least one phrase according to the determined combination order. For example, if a numerical value representing the importance of the information related to the fine dust is higher than a numerical value representing the importance of the information related to the UV index, the electronic device 100 may determine the combination order in which a phrase corresponding to the information related to the fine dust is arranged before a phrase corresponding to the information related to the UV index. The electronic device 100 may generate the response sentence (response sentence 20 illustrated in (a) of FIG. 1) by combining the plurality of phrases in the determined order.

In another embodiment, if a user command for determining the importance of the information related to the plurality of categories is input, the electronic device 100 may generate the response sentence by combining at least one of the plurality of phrases based on the determined importance. The embodiment regarding this will be described with reference to FIG. 8.

Figure 5:
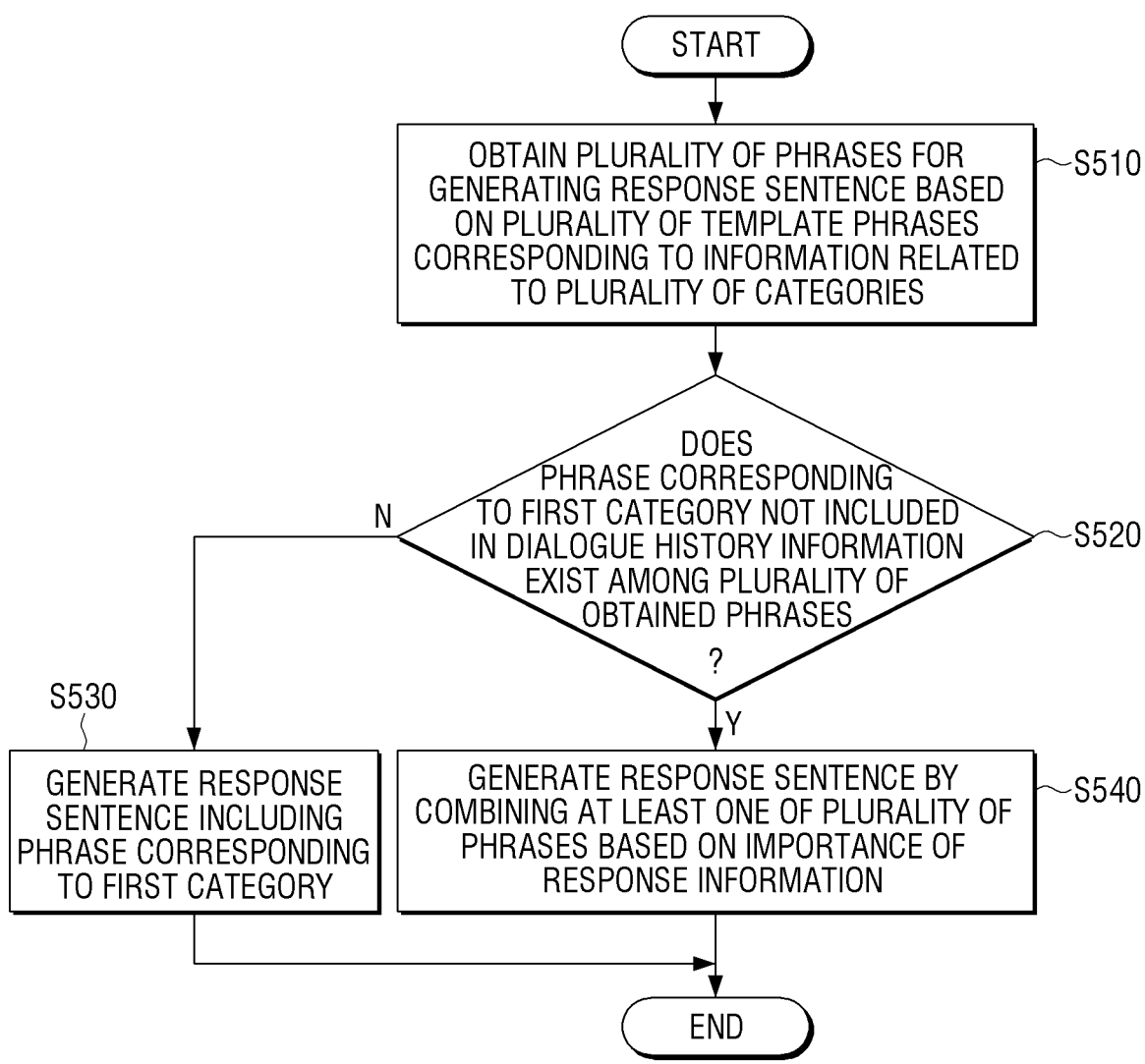
FIG. 5 is a flowchart for illustrating a process of generating a response sentence by an electronic device according to an embodiment of the disclosure.

FIG. 5 is a flowchart for illustrating a process of generating a response sentence by an electronic device according to an embodiment of the disclosure. The description overlapped with FIG. 4 will not be repeated.

Referring to FIG. 5, the electronic device 100 may obtain a plurality of phrases for generating the response sentence based on the plurality of template phrases corresponding to the information related to the plurality of categories S510. The electronic device 100 may determine whether the phrase corresponding to the first category not included in the dialogue history information exists among the plurality of obtained phrases S520. The phrase corresponding to the category not included in the dialogue history information may include a phrase not generated as a response sentence in the past, a phrase not included in a text corresponding to the input user's voice, or the like.

If it is determined that the phrase corresponding to the first category not included in the dialogue history information exists among the plurality of phrases, the electronic device 100 may generate the response sentence including the phrase corresponding to the first category S530. For example, if it is determined that a phrase corresponding to "hail" (e.g., "It will be hailing") not included in the dialogue history information exists among the plurality of phrases, the electronic device 100 may generate a response sentence including the phrase corresponding to the hail.

In another embodiment, if at least two phrases corresponding to a second category which is a combination of two categories not included in the dialogue history information are included among the plurality of phrases, the electronic device 100 may generate a response sentence including the phrase corresponding to the second category. For example, if the combination of categories corresponding to two (e.g., "fine dust level is very bad" and "precipitation is 100 mm") of the plurality of phrases is not included in the dialogue history information, the electronic device 100 may generate the response sentence including the phrases corresponding to the fine dust level and the precipitation.

If it is determined that the phrase corresponding to the first category not included in the dialogue history information does not exist among the plurality of phrases, the electronic device 100 may generate a response sentence by combining at least one of the plurality of phrases based on the importance of the information related to the plurality of categories S540.

Figure 6:
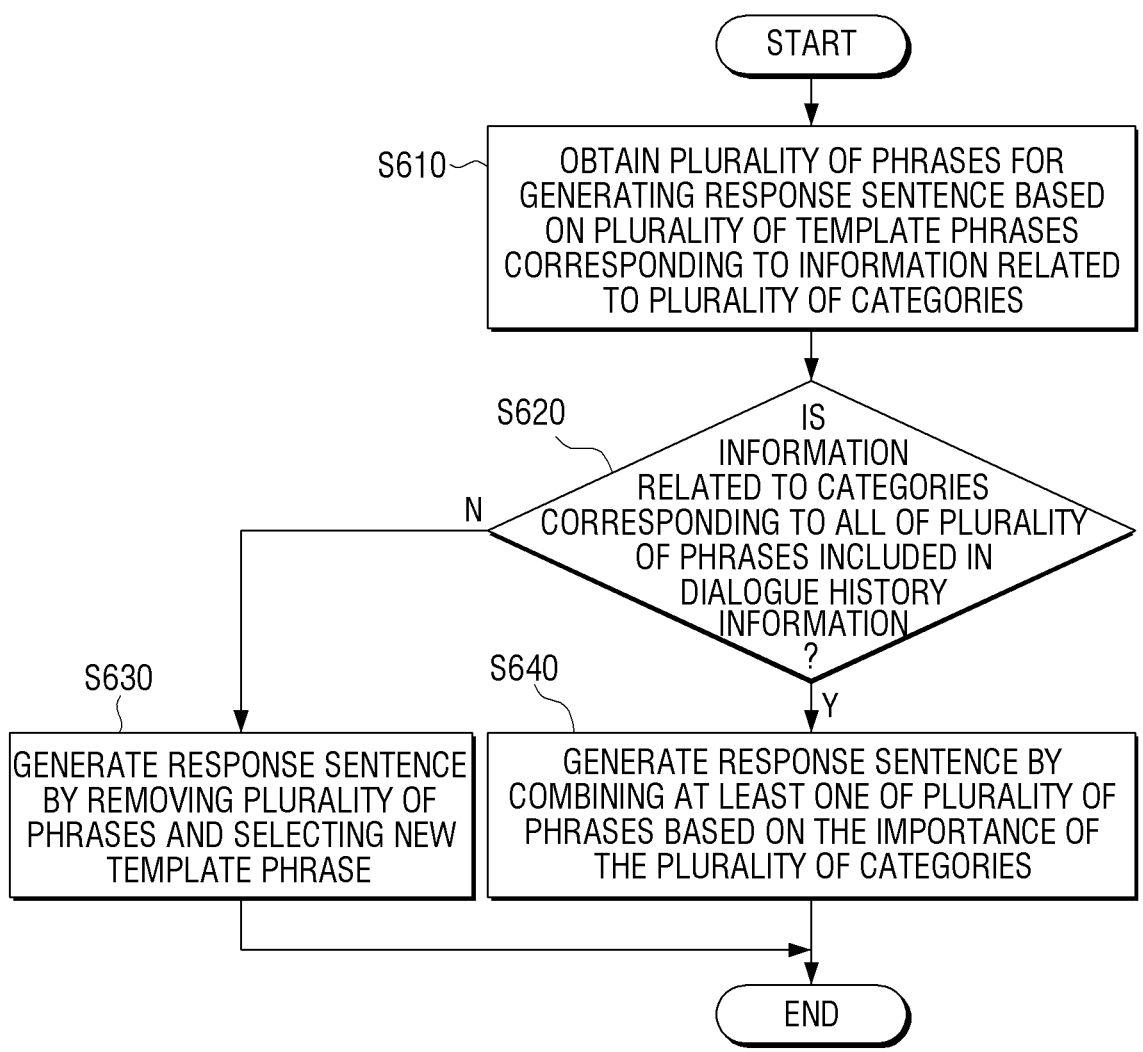
FIG. 6 is a flowchart for illustrating a process of generating a response sentence by an electronic device according to an embodiment of the disclosure.

FIG. 6 is a flowchart for illustrating a process of generating a response sentence by an electronic device according to an embodiment of the disclosure. The description overlapped with FIG. 4 will not be repeated.

Referring to FIG. 6, the electronic device 100 may obtain the plurality of phrases for generating the response sentence based on the plurality of template phrases corresponding to the information related to the plurality of categories S610. The electronic device 100 may determine whether the information related to the categories corresponding to all of the plurality of phrases is included in the dialogue history information S620. If the information related to the categories corresponding to all of the plurality of phrases is included in the dialogue history information, the electronic device 100 may generate a response sentence by removing the plurality of phrases and selecting a new template phrase S630. In an embodiment, if the obtained information related to the categories corresponding to all of the plurality of phrases is the same as information related to the fine dust level and the information related to the highest temperature included in the dialogue history information, the electronic device 100 may generate a response sentence by removing the phrases corresponding to the information related to the fine dust level and the highest temperature and selecting a new template (e.g., "It's like yesterday's weather"). In other words, the electronic device 100 may remove the sentence same as the response sentence generated in the past and generate a sentence using a new template.

If the obtained information related to the categories corresponding to all of the plurality of phrases is not included in the dialogue history information, the electronic device 100 may generate a response sentence by combining at least one of the plurality of phrases based on the importance of the plurality of categories S640.

FIG. 7 is a view for illustrating a process of correcting a response sentence by an electronic device 100 according to an embodiment of the disclosure.

Referring to FIG. 7, the electronic device 100 may correct a response sentence to the user's voice generated based on the dialogue history information. In an embodiment, if meanings of two or more words among the plurality of words included in the response sentence to the user's voice are overlapped, the electronic device 100 may generate a response sentence by removing the word with the overlapped meaning and recombining the plurality of phrases based on the dialogue history information.

For example, if the response sentences of "Tomorrow is going to be sunny fine dust level is going to be high. The UV index is going to be high" are generated, the electronic device 100 may identify that the meanings of two words "high" included in the response sentences are overlapped. In addition, the electronic device 100 may identify that there is a high probability of recombination by removing one of the two phrases "is going to be high" included in the response sentences, correcting "fine dust level" to "fine dust level and", and correcting "UV index is" as "UV index are" through information regarding the response sentences generated in the past. Accordingly, the electronic device 100 may correct the response sentences into a response sentence of "Tomorrow is going to be sunny, and fine dust level and UV index are going to be high".

In another example, if a response sentence of "Monday is going to be sunny and Tuesday is going to be sunny" is generated, the electronic device 100 may identify that the meanings of the phrases of "is going to be sunny and" and "is going to be sunny" are overlapped. The electronic device 100 may identify that there is a high probability of generation of a sentence by recombining the plurality of phrases by removing "is going to be sunny and" among the "is going to be sunny and" and "is going to be sunny" and correcting "Monday" to "Monday and" through the response sentences generated in the past. Accordingly, the electronic device 100 may correct the response sentence to a response sentence of "Monday and Tuesday are going to be sunny".

In another example, if a response sentence of "Today's temperature is 25 degrees which is −1 degree higher than yesterday" is generated, the electronic device 100 may identify that there is a high probability that an expression "−1 degree higher" is a wrong expression through the response sentences generated in the past. Accordingly, the electronic device 100 may correct the expression "−1 degree higher" to an expression "1 degree lower".

In other words, the electronic device 100 may correct sentences shown in a table 710 before correction to sentences shown in a table 720 after correction based on the dialogue history information.

Figure 8:
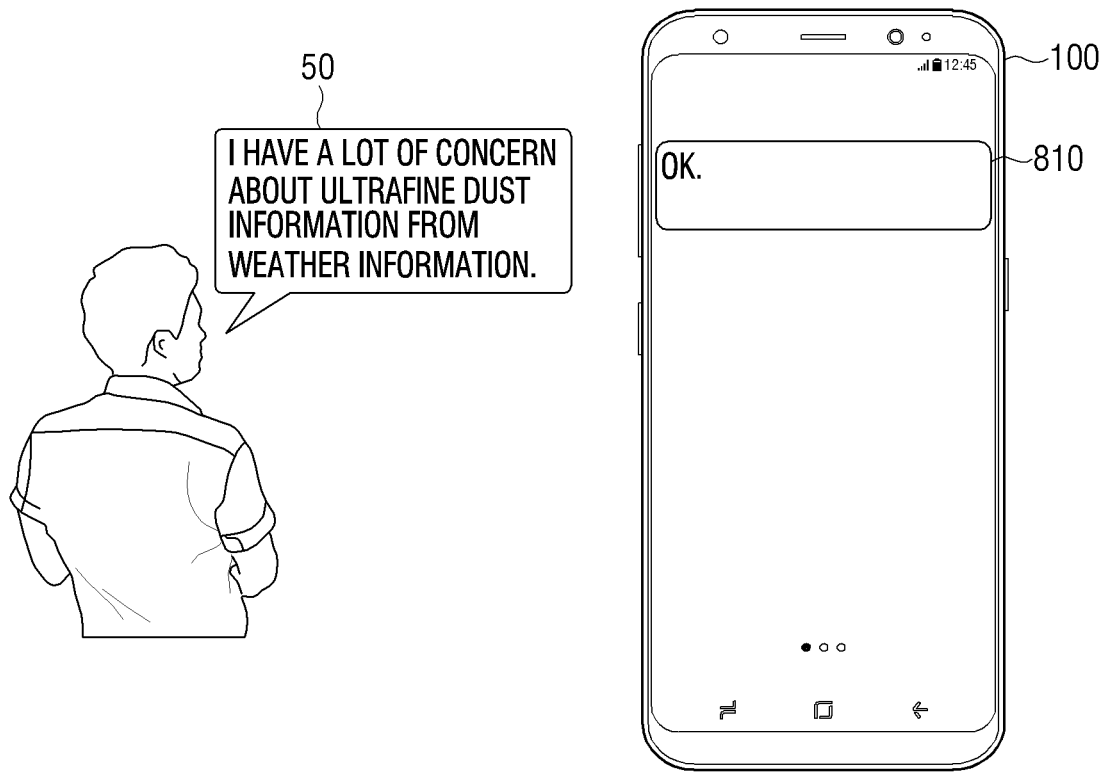
FIG. 8 is a view for illustrating a process of determining importance of response information by an electronic device according to an embodiment of the disclosure.

FIG. 8 is a view for illustrating a process of determining importance of information related to a plurality of categories by an electronic device according to an embodiment of the disclosure. Specifically, if a user command implying determination of the importance of the information related to the categories is input, the electronic device 100 may determine the combination order of at least one phrase corresponding to the information related to the category based on the input user command, and generate a response sentence by combining the at least one phrase according to the determined combination order. FIG. 8 illustrates a case where the user command implemented as a voice is input to the electronic device 100, but this is merely an embodiment, and the user command may be implemented as various interactions such as a user touch and the like.

Referring to FIG. 8, the electronic device 100 may receive a user command 50 indicating that the user has a lot of concern about ultrafine dust information from weather information. The electronic device 100 may determine the combination order in which the phrase corresponding to the information related to the fine dust among the information related to the plurality of categories is preferentially arranged. The electronic device 100 may generate a response sentence in accordance with the combined order.

Figure 9A:
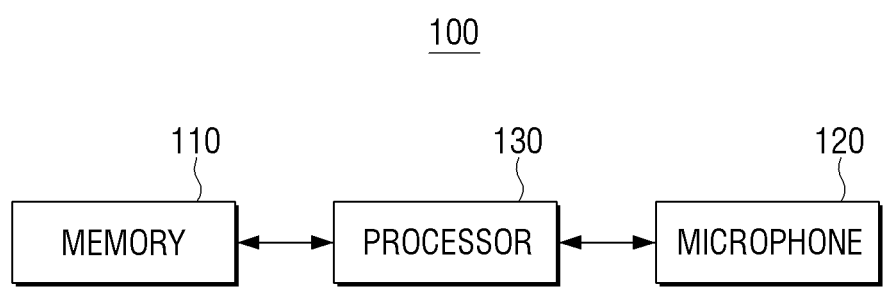
FIG. 9A is a block diagram schematically illustrating a configuration of an electronic device according to an embodiment of the disclosure.

FIG. 9A is a block diagram schematically illustrating a configuration of the electronic device according to an embodiment of the disclosure.

Referring to FIG. 9A, the electronic device 100 may include a memory 110, a microphone 120, and a processor 130. The configuration illustrated in FIG. 9A is an explanatory diagram for implementing the embodiments of the disclosure and appropriate hardware and software configurations which are apparent to those skilled in the art may be additionally included in the electronic device 100.

The memory 110 may store an instruction or data related to at least another element of the electronic device 100. The instruction may be an action statement for the processor 130 in a programming language and is a minimum unit of a program executable directly by the processor 130. In an embodiment, the memory 110 may be implemented as a non-volatile memory, a volatile memory, a flash memory, a hard disk drive (HDD), or a solid state drive (SSD). The memory 110 may be accessed by the processor 130 and reading, recording, editing, deleting, or updating of the data by the processor 130 may be executed. A term, memory, in the disclosure may include the memory 110, a ROM (not illustrated) and a RAM (not illustrated) in the processor 130, or a memory card (not illustrated) (e.g., micro SD card or memory stick) mounted on the electronic device 100. In addition, the memory 110 may store programs and data for forming various screens to be displayed on a display area of the display 150.

In particular, the memory 110 may store a program for executing an artificial intelligence agent. The artificial intelligence agent is a program personalized for providing various services for the electronic device 100.

In addition, the memory 110 may store a dialogue system trained for obtaining response information to an input user's voice and dialogue history information. In addition, the memory 110 may store the dialogue history information obtained through the dialogue system. The memory 110 may store template phrases for generating the response sentence to the user's voice.

The microphone 120 is an element for receiving the user's voice and may be provided in the electronic device 10, but this is merely an embodiment, and the microphone 120 may be provided outside of the electronic device 100 and electrically connected to the electronic device 100 or may be connected thereto to communicate via a communicator 140.

The processor 130 may be electrically connected to the memory 110 to control general operations and functions of the electronic device 100. Particularly, the processor 130 may execute at least one instruction stored in the memory 110 to obtain response information for generating the response sentence to the user's voice input via the microphone 120. In an embodiment, the processor 130 may determine whether to transmit the user's voice to the external server based on the domain of the text corresponding to the user's voice. If it is determined to transmit the user's voice to the external server, the processor 130 may control the communicator 140 to transmit the user's voice to the external server. The processor 130 may receive the response information from the external server via the communicator 140.

The processor 130 may obtain information related to the plurality of categories by clustering at least one of the response information and the dialogue history information. Specifically, the processor 130 may classify the response information into the plurality of categories by clustering the response information and obtain information for dividing each classified category into a plurality of levels, numerical value information, and the like.

The processor 130 may obtain the plurality of phrases for generating the response sentence based on the plurality of template phrases corresponding to the information related to the plurality of categories. In addition, the processor 130 may generate a response sentence by combining at least one of the plurality of phrases based on the stored dialogue history information and the importance of the information related to the plurality of categories.

In addition, the processor 130 may obtain numerical values representing the importance of each of information related to the plurality of categories based on the dialogue history information. In an embodiment, the processor 130 may obtain numerical values representing the importance of the information related to each category according to how much information related to the plurality of categories is included in the dialogue history information. For example, if the amount of information related to the fine dust included in the dialogue history information is greater than the amount of the information related to the highest temperature, the numerical value representing the importance of the information related to the fine dust may be higher than that of the highest temperature.

The processor 130 may generate a response sentence by combining at least one of the plurality of phrases corresponding to the information related to the plurality of categories based on the numerical value representing the importance.

In addition, the processor 130 may determine the combination order of at least one phrase corresponding to the information related to the category based on the numerical values representing the importance and generate a response sentence by combining the at least one phrase according to the determined combination order. In other words, the processor 130 may determine the combination order in which the phrase corresponding to the information related to the category with the high numerical value representing the importance is arranged at the front, and generate a response sentence by combining at least one of the plurality of phrases according to the determined combination order.

If a user command implying determination of the importance is input, the processor 130 may determine the combination order of at least one phrase corresponding to the information related to the category based on the user command and generate a response sentence by combining the at least one phrase according to the determined combination order. In other words, the processor 130 may determine the importance differently according to the information related to the category according to the user command.

In addition, if the phrase corresponding to the first category not included in the dialogue history information exists in the plurality of obtained phrases, the processor 130 may generate a response sentence including the phrase corresponding to the first category. In other words, the processor 130 may identify the information related to the category corresponding to the phrase included in the response sentence not generated in the past as important information, and generate a response sentence including the phrase corresponding to the information related to the corresponding category.

In addition, if the information related to the category corresponding to all of the plurality of obtained phrases is included in the dialogue history information, the processor 130 may generate a response sentence by removing the plurality of phrases and selecting at least one of new template phrases. In other words, if all of the plurality of obtained phrases are included in the information related to the category corresponding to the phrase included in the response sentences generated in the past, the processor 130 may generate a response sentence not overlapped with the response sentence in the past by removing the plurality of phrases and selecting the new template phrase.

The processor 130 may correct a response sentence to the user's voice generated based on the dialogue history information. For example, if meanings of two or more words among the plurality of words included in the response sentence to the user's voice are overlapped, the processor 130 may generate a response sentence by removing the word with the overlapped meaning and recombining the plurality of phrases based on the dialogue history information.

The function related to the artificial intelligence according to the disclosure is operated by the processor and the memory. The processor may be formed of one or a plurality of processors. The one or the plurality of processors may be a general-purpose processor such as a central processing unit (CPU), an auxiliary processor (AP), or a digital signal processor (DSP), a graphic dedicated processor such as a graphics processing unit (GPU) or a vision processing unit (VPU), or an artificial intelligence dedicated processor such as an NPU, or the like. The one or the plurality of processors may perform control to process the input data according to a predefined action rule stored in the memory or an artificial intelligence model. In addition, if the one or the plurality of processors are artificial intelligence dedicated processors, the artificial intelligence dedicated processor may be designed to have a hardware structure specialized in processing of a specific artificial intelligence model.

The predefined action rule or the artificial intelligence model is formed through training. The forming through training herein may refer, for example, to forming a predefined action rule or an artificial intelligence model set to perform a desired feature (or object) by training a basic artificial intelligence model using a plurality of pieces of learning data by a learning algorithm Such training may be performed in a device demonstrating artificial intelligence according to the disclosure or performed by a separate server and/or system. Examples of the learning algorithm include supervised learning, unsupervised learning, semi-supervised learning, or reinforcement learning, but is not limited to these examples.

The artificial intelligence model may be constituted with a plurality of neural network layers. The plurality of neural network layers have a plurality of weight values, respectively, and execute neural network processing through a processing result of a previous layer and processing between the plurality of weights. The plurality of weights of the plurality of neural network layers may be optimized by the training result of the artificial intelligence model. For example, the plurality of weights may be updated to reduce or to minimize a loss value or a cost value obtained by the artificial intelligence model during the training process. The artificial neural network may include deep neural network (DNN), and, for example, include a convolutional neural network (CNN), deep neural network (DNN), recurrent neural network (RNN), restricted Boltzmann machine (RBM), deep belief network (DBN), bidirectional recurrent deep neural network (BRDNN), or deep Q-network, but there is no limitation to these examples.

Figure 9B:
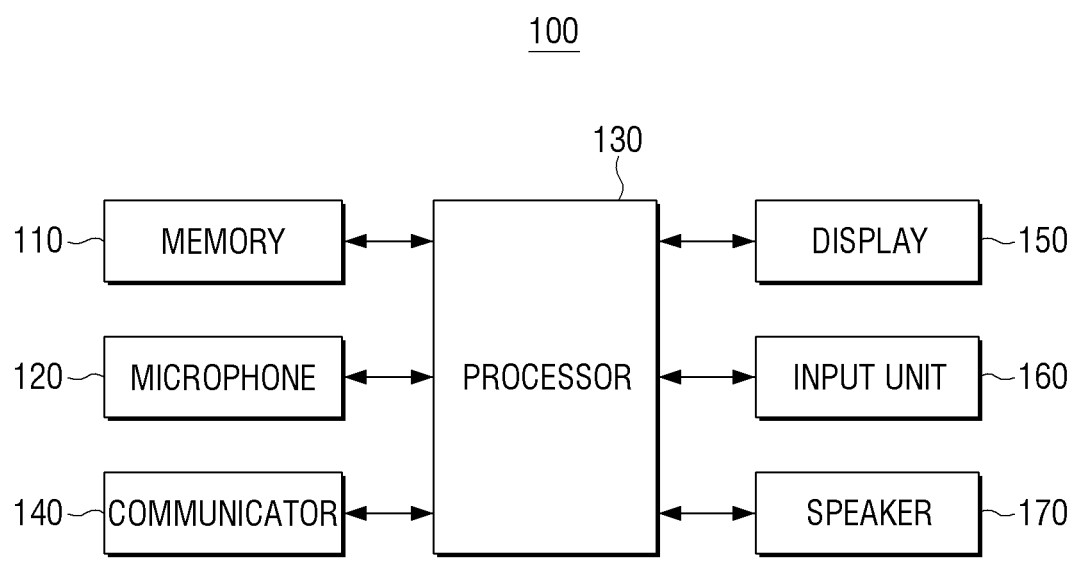
FIG. 9B is a block diagram specifically illustrating a configuration of an electronic device according to an embodiment of the disclosure.

FIG. 9B is a block diagram specifically illustrating a configuration of an electronic device according to an embodiment of the disclosure.

Referring to FIG. 9B, the electronic device 100 may include the memory 110, the microphone 120, the processor 130, the communicator 140, the display 150, an input unit 160, a speaker 170. The memory 110, the microphone 120, and the processor 130 have been described with reference to FIG. 9A, and thus the overlapped description will not be repeated.

The communicator 140 may communicate with an external device and an external server via various communication methods. The communication connection of the communicator 140 to the external device and the external server may include communication via a third device (e.g., a repeater, a hub, an access point, a gateway, or the like).

The communicator 140 may include various communication modules to communicate with the external device. In an example, the communicator 140 may include wireless communication modules and, for example, include a cellular communication module using at least one of long-term evolution (LTE), LTE Advance (LTE-A), code division multiple access (CDMA), wideband CDMA (WCDMA), universal mobile telecommunications system (UMTS), Wireless Broadband (WiBro), or global system for mobile communications (GSM). In another example, the wireless communication module may, for example, include at least one of wireless fidelity (Wi-Fi), Bluetooth, Bluetooth Low Energy (BLE), and Zigbee.

The display 150 may display various pieces of information in accordance with the control of the processor 130. In particular, the display 150 may display a user interface (UI) to which a user command implying determination of the importance of the information related to the plurality of categories is able to be input in accordance with the control of the processor 130.

The display 150 may also be implemented as a touch screen with a touch panel. However, the display 150 is not limited to the above implementation and may be implemented differently according to the type of the electronic device 100.

The input unit 160 may receive various user inputs and transmit the user inputs to the processor 130. In particular, the input unit 160 may include a touch sensor, a (digital) pen sensor, a pressure sensor, and a key. The touch sensor may use, for example, at least one type of an electrostatic type, a pressure-sensitive type, an infrared type, or an ultrasonic type.

In particular, if a user command implying determination of the importance of the information related to the plurality of categories is input, the input unit 160 may receive a signal including the user command and transmit the signal to the processor 130.

The speaker 170 is an element outputting not only various pieces of audio data obtained by executing various processing such as decoding, amplification, or noise filtering by an audio processor (not shown), but also various alerts or voice messages. Particularly, the speaker 170 may output a response sentence to the user's voice in a form of a voice.

But, the speaker 170 is merely an embodiment and may be implemented as another output terminal capable of outputting audio data.

Figure 10:
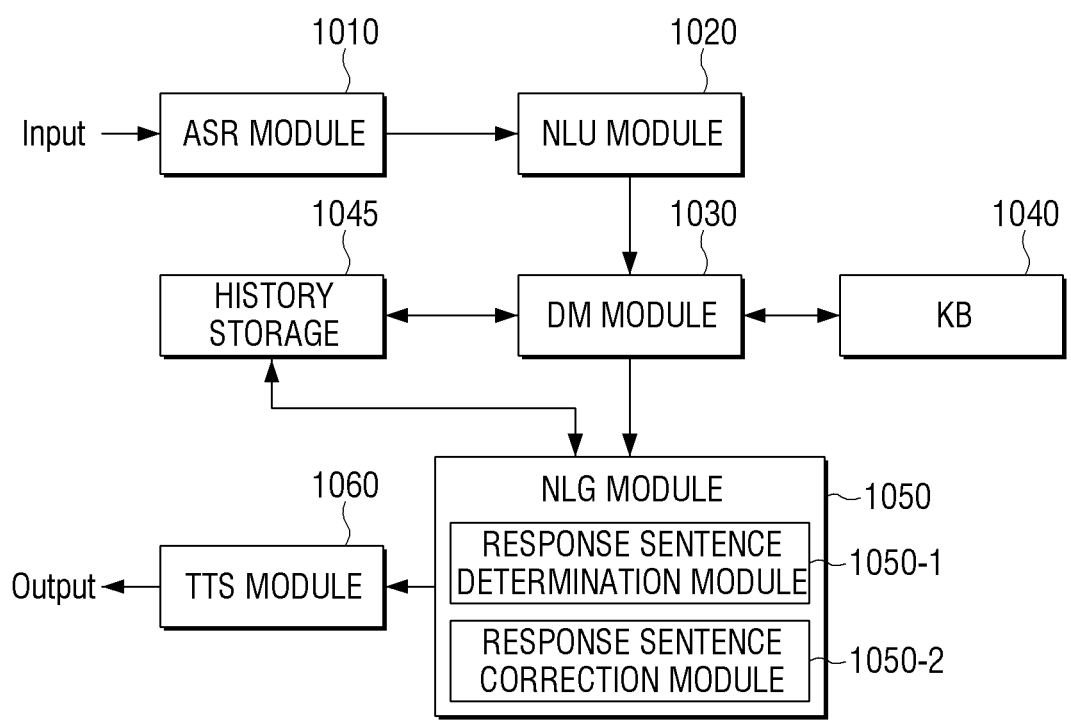
FIG. 10 is a block diagram for illustrating a software module of an electronic device according to an embodiment of the disclosure.

FIG. 10 is a block diagram for illustrating a software module of an electronic device according to an embodiment of the disclosure.

Referring to FIG. 10, the electronic device 100 may store a dialogue system for recognizing a user's voice and generating a response sentence to the user's voice in the memory 110. As illustrated in FIG. 10, the dialogue system may include a plurality of modules and each module may be executed by the processor 130.

An automatic speech recognition (ASR) module 1010 may perform speech recognition of an input user's voice and derive a text corresponding to the recognized voice. For example, if a user's voice of "How's weather today?" is input, the ASR module 1010 may recognize the input user's voice and derive a text of "How's weather today?" corresponding to the user's voice.

A natural language understanding (NLU) module 1020 may determine user's intent and a parameter using a matching rule divided into a domain, an intent, and a parameter (or slot) necessary to grasp the intent based on a speech recognition result obtained through the ASR module 1010. Specifically, one domain (e.g., alarm) may include a plurality of intent (e.g., alarm setting and alarm canceling) and one intent may include a plurality of parameters (e.g., time, number of time for repeating, an alarm tone, and the like). The matching rule may be stored in an NLU database (not illustrated). The NLU module 1020 may grasp meaning of a word extracted from the user input using features of language (e.g., grammatical points) such as a morpheme or a phrase, and determine a user's intent by matching the grasped meaning of the word to the domain and the intent. For example, if the user's voice converted into a text through the ASR module 1020 is "How's weather today?", the NLU module 1020 may obtain intent that the user requests for information regarding "today's weather" by grasping the meaning of the words "weather today" and "how".

A dialogue management (DM) module 1030 may determine whether the user's intent grasped by the NLU module 1020 is clear. For example, the DM module 1030 may determine whether the user's intent is clear based on whether the information of the parameters is sufficient.

If an operation is able to be performed based on the intent grasped by the NLU module 1020 and parameters, the DM module 1030 may generate a result of a task corresponding to the user input. In other words, the DM module 1030 may obtain information for generating a response sentence based on the intent of the user's voice grasped through the NLU module 1020 and data stored in a knowledge base 1040. For example, if the NLU module 1030 grasps the intent that the user requests for information regarding the "today's weather", the DM module 1030 may obtain response information including the information regarding the today's weather.

The knowledge base 1040 may refer to a database storing information usable to generate the response sentence. In an embodiment, the knowledge base 1040 may store information regarding a correlation (e.g., vertical relationship, degree of association between categories, or the like) between a plurality of categories (e.g., fine dust level, temperature, rainfall probability, and the like) corresponding to the weather domain. In another example, the knowledge base 1040 may store data obtained by structurizing information related to the category obtained in real time from the external server and information related to the category obtained in the past based on predetermined criteria.

A history storage 1045 may refer to a physical and theoretical space storing information regarding a response sentence provided to a user by the dialogue system. Specifically, the history storage 1045 may store dialogue history information including history information of the user's voice, information related to the response sentences to the user's voice generated in the past, and the like. In another embodiment, the history storage 1045 may store information regarding a style of the response sentence (e.g., polite form, plain form, or the like), information related to the plurality of categories included in the response sentence, and the like.

A natural language generator (NLG) module 1050 may include a response sentence determination module 1050-1 which determines a response sentence to the user's voice in a text form which is a natural language utterance form based on the response information obtained through the DM module 1030 and the dialogue history information stored in the history storage 1045 and a response sentence correction module 1050-2 which corrects the determined response sentence.

According to an embodiment of the disclosure, the response sentence determination module 1050-1 may generate a response sentence using at least one of the response information obtained through the DM module 1030 and a plurality of template phrases stored in a NLG database (not illustrated).

Specifically, the response sentence determination module 1050-1 may obtain a plurality of phrases based on a plurality of template phrases corresponding to the obtained information related to the plurality of categories by clustering at least one of the response information and the dialogue history information. For example, the NLG module 1050 may obtain phrases of "The fine dust level is very bad" and "The highest temperature is 30 degrees" using "fine dust level is" and "highest temperature is" which are the plurality of template phrases corresponding to the information related to the plurality of categories.

The response sentence determination module 1050-1 may generate a response sentence by combining at least one of the plurality of phrases based on the dialogue history information and the importance of the information related to the plurality of categories. For example, if the importance of the fine dust level among the information related to the plurality of categories is determined to be higher than the importance of the highest temperature, the NLG module may generate response sentences of "Today's fine dust level is very bad. Today's highest temperature is 30 degrees".

The response sentence correction module 1050-2 may correct the response sentence generated by the response sentence determination module 1050-1 based on the dialogue history information. Specifically, if meanings of at least two or more words among the plurality of words included in the response sentence are overlapped, the response sentence correction module 1050-2 may generate a response sentence by removing the word with the overlapped meaning and recombining the plurality of phrases based on the dialogue history information. For example, if it is determined that the meanings of words "today's" are overlapped in the sentences of "Today's fine dust level is very bad. Today's highest temperature is 30 degrees", the response sentence correction module 1050-2 may identify that there are high frequency and probability that "today's" of the second sentence is removed and "bad." is corrected to "bad and" through the response sentences generated in the past. Accordingly, the response sentence correction module 1050-2 may correct the response sentence to "Today's fine dust level is very bad and the highest temperature is 30 degrees".

A text-to-speech (TTS) module 1060 may convert the generated response sentence into a voice. Accordingly, the dialogue system may provide the response sentence to the user's voice as a voice, and therefore the user may have a dialogue with the electronic device 100.

According to the embodiments described above, the electronic device generates a response sentence to a user's voice based on dialogue history information, and therefore, the user may efficiently receive an answer personalized for the user.

However, the embodiments of the disclosure are described with reference to the accompanying drawings. It should be noted that the technologies disclosed in this disclosure are not for limiting the scope of the disclosure to a specific embodiment, but they should be interpreted to include all modifications, equivalents and/or alternatives of the embodiments of the disclosure. In relation to explanation of the drawings, similar reference numerals may be used for similar elements.

In this disclosure, the terms such as "comprise", "may comprise", "consist of", or "may consist of" are used herein to designate a presence of corresponding features (e.g., constituent elements such as number, function, operation, or part), and not to preclude a presence of additional features.

In this disclosure, expressions such as "A or B", "at least one of A [and/or] B,", or "one or more of A [and/or] B," include all possible combinations of the listed items. For example, "A or B", "at least one of A and B,", or "at least one of A or B" includes any of (1) at least one A, (2) at least one B, or (3) at least one A and at least one B.

The expressions "first," "second" and the like used in the disclosure may denote various elements, regardless of order and/or importance, and may be used to distinguish one element from another, and does not limit the elements.

If it is described that a certain element (e.g., first element) is "operatively or communicatively coupled with/to" or is "connected to" another element (e.g., second element), it should be understood that the certain element may be connected to the other element directly or through another element (e.g., third element). On the other hand, if it is described that a certain element (e.g., first element) is "directly coupled to" or "directly connected to" another element (e.g., second element), it may be understood that there is no element (e.g., third element) between the certain element and the another element.

Also, the expression "configured to" used in the disclosure may be interchangeably used with other expressions such as "suitable for," "having the capacity to," "designed to," "adapted to," "made to," and "capable of," depending on cases. Meanwhile, the expression "configured to" does not necessarily refer to a device being "specifically designed to" in terms of hardware. Instead, under some circumstances, the expression "a device configured to" may refer to the device being "capable of" performing an operation together with another device or component. For example, the phrase "a unit or a processor configured (or set) to perform A, B, and C" may refer, for example, and without limitation, to a dedicated processor (e.g., an embedded processor) for performing the corresponding operations, a generic-purpose processor (e.g., a CPU or an application processor), or the like, that can perform the corresponding operations by executing one or more software programs stored in a memory device.

An electronic device according to various embodiments of the disclosure may include at least one of, for example, a smartphone, a tablet personal computer (PC), a desktop PC, a laptop PC, a netbook computer, a server, a personal data assistant (PDA), a medical device, a wearable device, or the like. In some embodiments, the electronic device may include at least one of, for example, a television, a refrigerator, air-conditioner, an air purifier, a set top box, and a media box (e.g., SAMSUNG HOMESYNC™, APPLE TV™, or GOOGLE TV™).

A term "user" may refer to a person using an electronic device or a device (e.g., an artificial intelligence electronic device) using an electronic device.

Various embodiments of the disclosure may be implemented as software including instructions stored in machine (e.g., computer)-readable storage media. The machine is a device which invokes instructions stored in the storage medium and is operated according to the invoked instructions, and may include an electronic device (e.g., electronic device 100) according to the disclosed embodiments. In a case where the instruction is executed by a processor, the processor may perform a function corresponding to the instruction directly or using other elements under the control of the processor. The instruction may include a code made by a compiler or a code executable by an interpreter. The machine-readable storage medium may be provided in a form of a non-transitory storage medium. Here, the "non-transitory storage medium" is tangible and may not include signals, and it does not distinguish that data is semi-permanently or temporarily stored in the storage medium. For example, the "non-transitory storage medium" may include a buffer temporarily storing data.

According to an embodiment, the methods according to various embodiments disclosed in this disclosure may be provided to be included in a computer program product. The computer program product may be exchanged between a seller and a purchaser as a commercially available product. The computer program product may be distributed in the form of a machine-readable storage medium (e.g., compact disc read only memory (CD-ROM)) or distributed online through an application store (e.g., PlayStore™). In a case of the on-line distribution, at least a part of the computer program product (e.g., downloadable application) may be at least temporarily stored or temporarily generated in a storage medium such as a memory of a server of a manufacturer, a server of an application store, or a relay server.

Each of the elements (e.g., a module or a program) according to various embodiments described above may include a single entity or a plurality of entities, and some sub-elements of the abovementioned sub-elements may be omitted or other sub-elements may be further included in various embodiments. Alternatively or additionally, some elements (e.g., modules or programs) may be integrated into one entity to perform the same or similar functions performed by each respective element prior to the integration. Operations performed by a module, a program, or other elements, in accordance with various embodiments, may be performed sequentially, in a parallel, repetitive, or heuristically manner, or at least some operations may be performed in a different order, omitted, or may add a different operation.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a microphone;
   a display;
   a speaker;
   a memory configured to store at least one instruction and dialogue history information; and
   a processor configured to be connected to the microphone, the display, the speaker, and the memory and control the electronic device,
   wherein the processor, upon execution of the stored at least one instruction, is further configured to:
      based on a user's voice being input via the microphone, obtain response information for generating a response sentence to the user's voice,
      select a plurality of template phrases for generating the response sentence to the user's voice based on the dialogue history information,
      obtain information related to a plurality of categories by clustering at least one of the response information and the dialogue history information,
      obtain a plurality of phrases based on the plurality of template phrases corresponding to the information related to the plurality of categories,
      obtain values representing importance of each of the information related to the plurality of categories based on the dialogue history information,
      generate the response sentence by combining at least some of the plurality of phrases based on the values representing importance, and
      control at least one of the speaker or the display to output the generated response sentence, and
   wherein the processor is further configured to:
      based on information related to categories corresponding to the plurality of phrases being included in the dialogue history information, select at least one of another template phrases, and
      generate the response sentence using the response information and the at least one of the another template phrases.

2. The device according to claim 1, wherein the processor, upon execution of the stored at least one instruction, is further configured to:
   determine a combination order of at least one phrase corresponding to the information related to each category based on a numerical value representing the importance of each information related to the plurality of categories, and
   generate the response sentence by combining the at least one phrase according to the determined combination order.

3. The device according to claim 1, wherein the processor, upon execution of the stored at least one instruction, is further configured to:
   based on a user command implying determination of the importance of the information related to each category being input, determine a combination order of at least one phrase corresponding to the information related to the category based on the user command, and
   generate the response sentence by combining the at least one phrase according to the determined combination order.

4. The device according to claim 1, wherein the processor, upon execution of the stored at least one instruction, is further configured to:
   based on a phrase corresponding to a first category not included in the dialogue history information existing among the plurality of obtained phrases, generate the response sentence to include the phrase corresponding to the first category.

5. The device according to claim 1, wherein the processor, upon execution of the stored at least one instruction, is further configured to:
correct the generated response sentence to the user's voice based on the dialogue history information.

6. The device according to claim 1, wherein the processor, upon execution of the stored at least one instruction, is further configured to:
based on meanings of at least two or more words among a plurality of words included in the response sentence to the user's voice being overlapped, generate the response sentence by removing the word with the overlapped meaning and recombining the plurality of phrases based on the dialogue history information.

7. The device according to claim 1, further comprising: a communicator comprising circuitry,
wherein the processor, upon execution of the stored at least one instruction, is further configured to:
determine whether to transmit the user's voice to an external server based on a domain of a text corresponding to the user's voice,
based on the user's voice being determined to be transmitted to the external server, control the communicator to transmit the user's voice to the external server, and
receive the response information for generating the response sentence to the user's voice from the external server via the communicator.

8. A method for controlling an electronic device, the method comprising:
based on a user's voice being input via a microphone, obtaining response information for generating a response sentence to the user's voice;
selecting a plurality of template phrases for generating the response sentence to the user's voice based on dialogue history information;
obtaining information related to a plurality of categories by clustering at least one of the response information and the dialogue history information;
obtaining a plurality of phrases based on the plurality of template phrases corresponding to the information related to the plurality of categories;
obtaining values representing importance of each of the information related to the plurality of categories based on the dialogue history information;
generating the response sentence by combining at least some of the plurality of phrases based on the values representing importance; and
controlling at least one of a speaker or a display to output the generated response sentence,
wherein the generating of the response sentence further comprises:
based on information related to categories corresponding to the plurality of phrases being included in the dialogue history information, selecting at least one of another template phrases; and
generating the response sentence using the response information and the at least one of the another template phrases.

9. The method according to claim 8, wherein the generating of the response sentence further comprises:
determining a combination order of at least one phrase corresponding to the information related to each category based on a numerical value representing the importance of each information related to the plurality of categories; and
generating the response sentence by combining the at least one phrase according to the determined combination order.

10. The method according to claim 8, wherein the generating of the response sentence further comprises:
based on a user command implying determination of the importance of the information related to each category being input, determining a combination order of at least one phrase corresponding to the information related to the category based on the user command; and
generating the response sentence by combining the at least one phrase according to the determined combination order.

11. The method according to claim 8, wherein the generating of the response sentence further comprises:
based on a phrase corresponding to a first category not included in the dialogue history information existing among the plurality of obtained phrases, generating the response sentence to include the phrase corresponding to the first category.

12. The method according to claim 8, wherein the generating of the response sentence further comprises:
correcting the generated response sentence to the user's voice based on the dialogue history information.

13. The method according to claim 12, wherein the generating of the response sentence further comprises:
based on meanings of at least two or more words among a plurality of words included in the response sentence to the user's voice being overlapped, generating the response sentence by removing the word with the overlapped meaning and recombining the plurality of phrases based on the dialogue history information.

14. The method according to claim 8, wherein the obtaining of the response information comprises:
determining whether to transmit the user's voice to an external server based on a domain of a text corresponding to the user's voice;
based on the user's voice being determined to be transmitted to the external server, transmitting the user's voice to the external server; and
receiving the response information for generating the response sentence to the user's voice from the external server.

* * * * *